United States Patent [19]

Treu

[11] Patent Number: 4,531,701
[45] Date of Patent: Jul. 30, 1985

[54] MULTISENSOR MOUNTING APPARATUS

[75] Inventor: Dennis M. Treu, Cedar Rapids, Iowa

[73] Assignee: Rockwell International Corporation, El Segundo, Calif.

[21] Appl. No.: 564,810

[22] Filed: Dec. 22, 1983

[51] Int. Cl.³ .............................................. G01P 1/02
[52] U.S. Cl. ...................................... 248/676; 248/1; 248/DIG. 1; 73/493; 73/497; 411/908
[58] Field of Search ................... 248/1, 675, 201, 346, 248/671, 676, 678, 139, DIG. 1, 137–138; 73/493, 497, 514; 374/187, 196; 308/DIG. 14; 411/393, 900, 907–908

[56] References Cited

U.S. PATENT DOCUMENTS

| | | | |
|---|---|---|---|
| 1,678,968 | 7/1928 | Allen | 248/DIG. 1 |
| 1,784,045 | 12/1930 | Clark | 248/676 |
| 1,814,626 | 7/1931 | Allen | 248/676 |
| 2,584,022 | 1/1952 | Johnson | 248/57 |
| 2,661,172 | 12/1953 | Needham | 248/671 |
| 2,885,165 | 5/1959 | Smolen | 248/671 |
| 3,167,966 | 2/1965 | Ashleman | 73/497 |
| 4,338,819 | 7/1982 | Marquess | 73/497 |
| 4,403,759 | 9/1983 | Hicks | 248/DIG. 1 |
| 4,414,634 | 11/1983 | Louis | 73/861.03 |

Primary Examiner—William H. Schultz
Assistant Examiner—Robert A. Olson
Attorney, Agent, or Firm—Robert C. Mayes; George A. Montanye; H. Fredrick Hamann

[57] ABSTRACT

A mounting technique and apparatus is disclosed for precision instrumentation and capable of allowing temperature induced dimensional changes without significantly affecting the precision of the instruments. A polymeric material is disposed on the surface of a clamping member (setscrew in a preferred embodiment) wherein the lateral movement of one element of the instrumentation is prevented by compression forces applied by the polymeric material and longitudinal motion is limited only by frictional load of the polymeric material in contact with the temperature stressed component. Thermal stress is minimized while maintaining alignment accuracy of the instrumentation.

4 Claims, 4 Drawing Figures

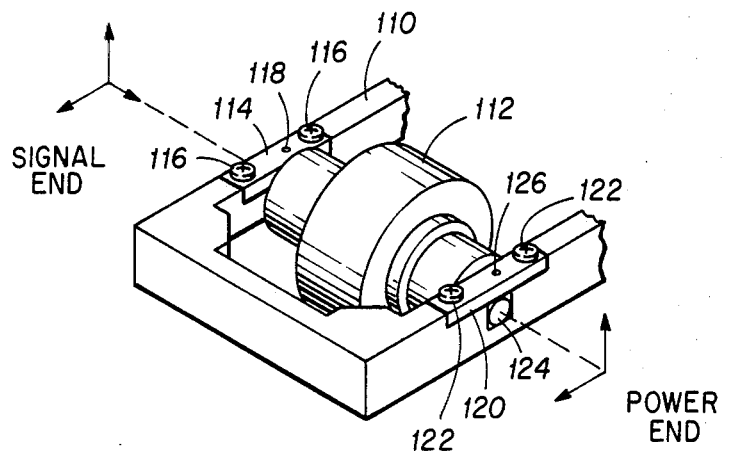
FIG 1
FIG 2
SIGNAL END
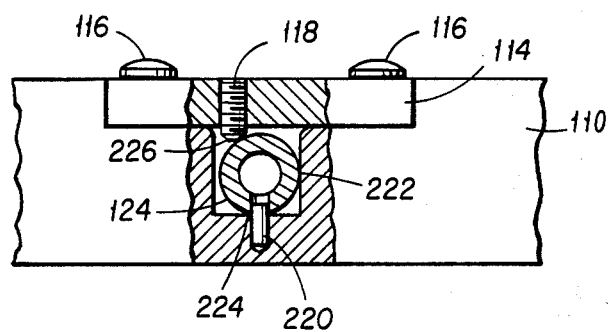
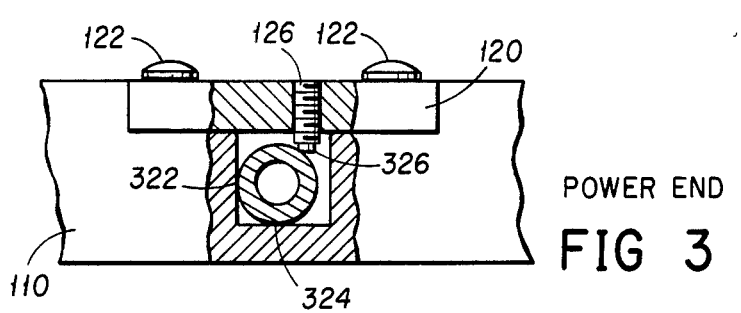
POWER END
FIG 3
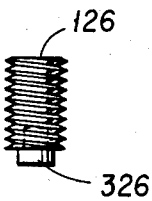
FIG 3a

MULTISENSOR MOUNTING APPARATUS

BACKGROUND OF THE INVENTION

This invention relates generally to mechanical mounting structure and more particularly to precision electromechanical sensory mounting structure having a requirement for precision alignment and typically used in a varying thermal environment.

In precision instrumentation, such as multisensor accelerometers and gyros, a number of diverse engineering requirements such as alignment accuracy, thermal stress tolerance, and cost-effectiveness, must all be considered in the design.

In one such device, a multiple sensor head is mounted on a centrally disposed support shaft and the shaft must be firmly attached to the sensor housing. Various methods of supporting the sensor shaft have been utilized such as clamps, pins, and setscrew retainers. Each of these methods has the capability of holding a shaft firmly; however, none of the previously-mentioned clamping means tolerates temperature induced variations in the dimensions of the shaft itself.

As the shaft temperature increases, there is a known amount of physical expansion which, across the diameter of the shaft, tends to be acceptable in most applications. However, the dimensional change along the central or longitudinal axis of the shaft tends to be much greater, and when utilizing rigid clamping means at both ends of such a shaft, tends to distort the output of the sensor head, thus generating erroneous or faulty data.

Additionally, a requirement for rigid lateral affixation of both ends of the shaft requires particular attention to tolerances in the manufacture of the components of such a device as well as prevention of any lateral free-play in the mounting structures.

SUMMARY AND BRIEF DESCRIPTION OF THE INVENTION

Accordingly, it is an object of the present invention to provide a multisensor mounting apparatus capable of maintaining lateral fixation for a multisensor central support shaft while allowing limited longitudinal dimensional variance caused by temperature fluctuations.

It is yet another object of the present invention to provide a temperature variation tolerant mounting apparatus for a structure having a major longitudinal axis while limiting lateral and rotational movement of said structure.

Briefly, and in accordance with the present invention, a mounting apparatus compensating for thermally-induced dimensional variance of a structure having a major longitudinal axis comprises a support fixture, means for rigidly attaching a first end of the structure to the support fixture, preventing relative longitudinal movement and lateral movement therebetween, and slidingly attaching means at the opposite end of the structure, preventing relative lateral movement, whereby longitudinal movement is allowed at the second end in a friction-reduced manner utilizing a setscrew tipped with a polymeric material. The polymeric material provides a non-marring compressive clamp for the structure against the housing support fixture, while still allowing limited longitudinal motion of the second end as a frictional function of the structure against the polymeric material.

In a preferred embodiment, a long-chain polymeric amide material such as nylon is utilized having both the compressive rigidity to provide the rigid lateral clamping, and the reduced frictional coefficient desired, thereby allowing longitudinal movement.

Other objects and features of the invention will become apparent upon reading the detailed description in conjunction with the drawings in which:

FIG. 1 is a perspective view of a representative multisensor unit in combination with the support shaft and housing unit;

FIG. 2 is a partial cut-away view of the rigid attachment end of the central shaft mounting in conjunction with the housing member;

FIG. 3 is a partial cut-away view of the opposite end of the central shaft mounting allowing longitudinal movement, preventing lateral movement showing the housing member in combination with the associated mounting apparatus;

FIG. 3a is an enlarged view of a nylon-tipped setscrew utilized in a preferred embodiment of the present invention.

DETAILED DESCRIPTION OF THE INVENTION

Referring now to FIG. 1, a representative multisensor unit is shown in perspective having housing 110 for supporting the multisensor head unit 112 utilizing the axially disposed central support shaft 124 for mounting.

As is known in the art, the signal conductors are typically fed through one end of shaft 124 to the associated electronics (not shown) while the power to drive the gyro unit is fed through conductors placed in the opposing end of the shaft to minimize signal interference. Thus, one end of the shaft is normally termed the "power end" and the opposite end of the shaft termed the "signal end" as a function of the nature of the conductors fed therethrough.

It is important to note that the mounting apparatus described and claimed herein may be utilized at either the signal end or power end, to allow thermally-induced longitudinal variance in the central support shaft 124. However, for purposes of this specification, the signal end is described and shown as the rigid attachment end of support shaft 124 and the power end is shown and described utilizing the temperature-tolerant mounting fasteners.

Threaded fasteners 116 on the signal end firmly hold the clamping bar 114 to the housing member 110. Additionally, the contacting setscrew 118 provides for three point rigid affixation of the support shaft 124 to the signal end as is shown with more detail in FIG. 2. The shaft 124 is held laterally in position by setscrew 126 which is supported by the clamping member 120 which is in turn rigidly attached to the housing member 110 by threaded fasteners 122.

Referring now to FIG. 2, the rigid shaft clamping structure is shown in a partial cut-away drawing showing threaded fasteners 116 holding the clamping bar 114 rigidly in position on the housing member 110. the setscrew 118 has a hardened face 226 for rigidly and firmly pressing shaft 124 against the surfaces 222 and 224 of housing member 110, thus preventing lateral movement relative to the housing. Pin 220 is placed in a mating hole in shaft 114, thereby preventing rotation and longitudinal movement of this portion of shaft 114.

Referring now to FIG. 3, the power end of the exemplary embodiment is shown in a partial cut-away view wherein threaded fasteners 122 firmly hold clamping bar 120 to the housing member 110. Lateral motion is prevented by setscrew 126 firmly holding the shaft against surfaces 322, 324 while allowing longitudinal movement as a frictional function of the polymeric material 326 on the end of setscrew 126.

Referring to FIG. 3a, an enlarged view of setscrew 126 is shown having the polymeric material (preferrably nylon or its equivalent) 326 providing the benefits of a non-marred contact with the central support shaft for the multisensor unit, allowing longitudinal movement in response to longitudinal dimensional changes in the shaft while compressively clamping the shaft against surfaces 322 and 324.

Thus, it can be seen that the precise alignment requirement for the multisensor unit is readily obtainable utilizing the present invention and slight variations in the longitudinal dimensions in the central shaft are readily tolerated without affecting the required alignment.

While the present invention has been described with respect to a specific exemplary embodiment, it can be seen that the mounting technique is not limited to this embodiment but may be adapted to a variety of applications as may become obvious to those skilled in the art. It is therefore contemplated that the appended claims will cover any such modifications of the embodiments as fall within the true scope of the invention.

What is claimed is:

1. A mounting apparatus compensating for thermally-induced dimensional variance of a structure having a major longitudinal axis comprising:
   a. a support fixture;
   b. means for rigidly attaching a first end of said structure to said support fixture, preventing relative longitudinal movement and lateral movement therebetween; and
   c. slidingly attaching means at a second end of said structure, preventing relative lateral movement; whereby longitudinal movement is allowed at said second end in a friction-reduced manner utilizing a setscrew tipped with a polymeric material.

2. A mounting apparatus as in claim 1 further comprising means for rotation prevention of said structure relative to said support fixture.

3. In a multisensor apparatus having an integral sensor support shaft, a locating mechanism for said shaft comprising:
   a. a multisensor supporting shaft having a major longitudinal axis;
   b. a housing having rigid clamping means affixed thereto and for maintaining a first portion of said shaft in a fixed position with respect to lateral, longitudinal, and rotational movement relative to said housing; and
   c. mounting means affixed to said housing for slidingly positioning a second portion of said shaft relative to said housing, preventing lateral movement and allowing limited longitudinal movement wherein said mounting means further comprises a setscrew tipped with a polymeric material; whereby said lateral movement is severely restricted relative to said housing as a function of direct pressure from said setscrew, and longitudinal movement is allowed as a frictional function of said polymeric material in contact with said shaft.

4. A multisensor apparatus having a sensor unit and a housing, wherein said sensor unit has an axially disposed mounting shaft with a first and a second mounting end of said shaft for attachment to said housing, a rigid attachment means for clamping said first mounting end in a rotational, longitudinal, and lateral direction, and said second mounting end attached to said housing utilizing means for clamping in a lateral direction only, thereby allowing limited longitudinal movement of said shaft relative to said housing, on said second mounting end, in response to thermally-induced dimensional changes, wherein said means for clamping further comprises a polymeric material disposed in contact with said shaft and providing a direct lateral clamping pressure relative to said housing, and allows limited longitudinal movement as a frictional function of said polymeric material in contact with said shaft.

* * * * *